Dec. 26, 1961 D. J. BORODIN ETAL 3,014,717

CLAMP

Filed March 21, 1957

INVENTORS
DANIEL J. BORODIN
JACK E. CAMPBELL
PAUL J. YE

BY *Barnes, Kisselle, Laughlin & Raisch*

ATTORNEYS

United States Patent Office 3,014,717

Patented Dec. 26, 1961

1

2

3,014,717
CLAMP

Daniel J. Borodin, Detroit, Jack E. Campbell, Grosse Pointe, and Paul J. Ye, Melvindale, Mich., assignors to Wagner Brothers Incorporated, Detroit, Mich., a corporation of Michigan Filed Mar. 21, 1957, Ser. No. 647,522

15 Claims. (Cl. 269—189)

This invention relates to plating machines and has more particularly to do with means for adjustably mounting on the reciprocating carriage of the machine the members for moving the work within tanks and from one tank to the next adjacent tank.

In the prior copending application of Borodin herein, Serial No. 596,712, filed July 9, 1956, now Patent No. 2,958,331, assigned to the assignee of this application, there is illustrated an automatic plating machine of the type to which the present invention relates. A machine of this type includes a row of plating tanks with a carriage positioned alongside the row of tanks and movable longitudinally. Elevators are mounted on the carriage for movement therewith. Over the tanks are arranged work rails which in turn slidably support work carriers. The carriage is provided with arms extending laterally over the tanks which support lifting members and pusher members that engage with the work carriers on the rails to transfer the work from one tank to another tank and to push the work along the rails within a tank. The arms which support the lifting members are mounted on the elevators. The members depending from these lateral arms on the carriage must be accurately located so that the work carriers will be properly engaged.

It is an object of the present invention to provide a clamp device which facilitates the mounting of the carrier engaging members on the lateral arms of the carriage.

More specifically, the invention contemplates a clamp arrangement for enabling the carrier engaging members to be mounted on the lateral arms of the carriage for ready adjustment in a vertical direction, a horizontal direction transversely of the tanks and a horizontal direction longitudinally of the tanks.

Figure 1:
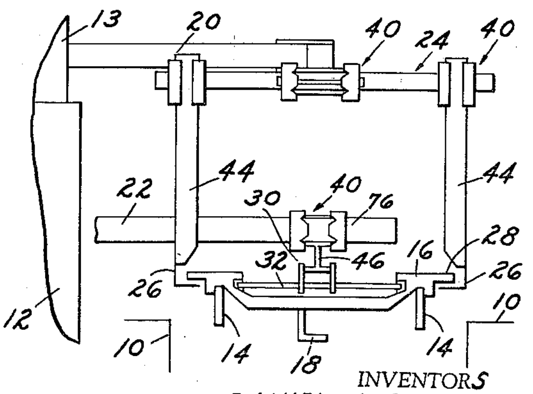
FIG. 1 is a fragmentary elevational view of a plating machine embodying the present invention.

Referring to FIG. 1, there is illustrated a portion of a plating machine of generally the same construction as the plating machine disclosed in said Borodin application Serial No. 596,712. The machine includes plating tanks 10 and a carriage 12 mounted along one side of the tanks 10 for reciprocation. Elevators 13 are mounted on carriage 12 for vertical movement thereon. A pair of rails 14 are mounted so as to extend longitudinally of the tanks 10. Rails 14 are adapted for supporting a work carrier 16 from which a work supporting rack may be suspended as from the hook 18. In conveying the work around the machine, it is at times necessary to push the carrier 16 within each tank on rails 14; and at other times, it is necessary to elevate the work carriers to transfer the work from one tank to the next adjacent tank. The work is conveyed around the machine by means of the carriage 12 with elevators 13, the specific construction of which is shown in said Borodin application Serial No. 596,712. For the purposes of the present description, it is suffice to say that carriage 12 is provided with two sets of laterally extending arms, the arms 20 which may be referred to as lifter arms, and the arms 22 which may be referred to as pusher arms. Arms 20 are connected with the elevators 13 and arms 22 are mounted on carriage 12 at points spaced longitudinally of arms 20. A lifting frame generally referenced 24 is supported by arms 20 and provided with lift angles 26 which engage flanges 28 on carriers 16 to lift the carriers 16 when the elevators 13 are actuated to rise. Pusher devices generally referenced 30 are supported on arms 22 and are provided with pusher bars 32 which are adapted to engage carriers 16 and push the carriers along the rails 14 when the carriage 12 is reciprocated. The specific cycle of operations of lift angles 26 and pusher bars 32 is fully shown and described in said prior copending application of Borodin Serial No. 596,712.

Figure 2:
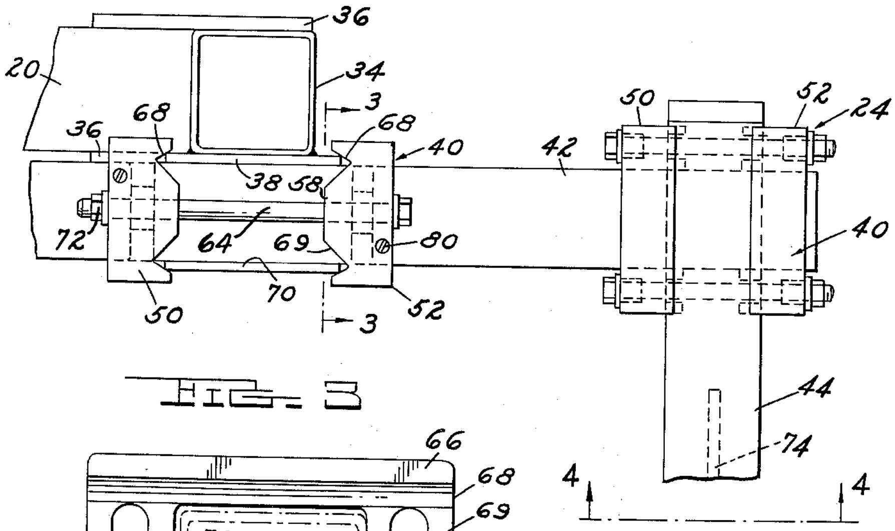
FIG. 2 is a fragmentary view of a portion of the arrangement shown in FIG. 1 on an enlarged scale.
Figure 3:
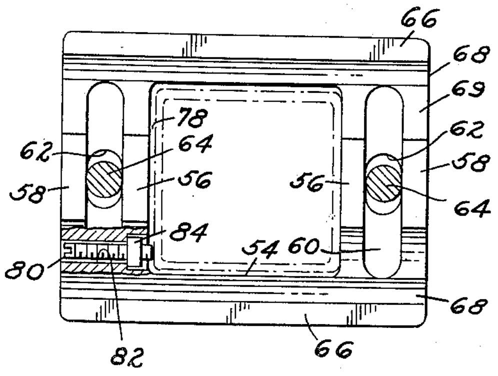
FIG. 3 is a sectional view taken along the lines 3—3 in FIG. 2.
Figure 4:
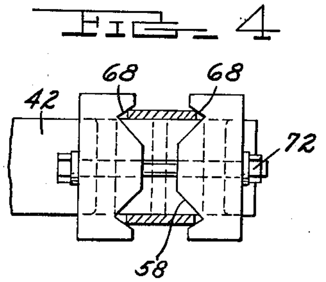
FIG. 4 is a sectional view taken along the lines 4—4 in FIG. 2.
Figure 5:
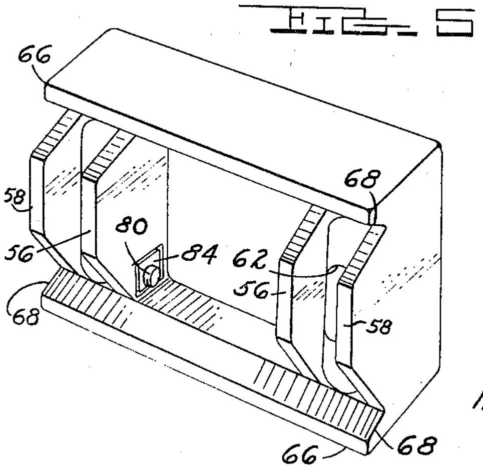
FIG. 5 is a perspective view of one of the jaws of the clamp member of the present invention.

Referring now to FIG. 2, arm 20 is in the form of a tube of square cross section. At its free end, there is attached to arm 20 a similar tube 34. Tube 34 is arranged perpendicularly to tube 20, and the connection between the two tubes is secured by plates 36. On the lower face of tube 34, there is welded a support plate 38. The lifting frame 24 is suspended from tube 34 by means of a clamping device of the present invention which is generally designated 40. This lifting frame includes a horizontal arm 42 and a pair of depending straps 44 at each end of arm 42 connected thereto by clamping devices 40. Lift angles 26 are connected to the lower ends of straps 44. The pusher devices 30 are supported by an I-beam member 46 which is in turn mounted on arms 22 by means of a clamping device 40.

All of the clamping devices 40 are of the same construction. Each clamping device includes two identical jaws 50 and 52. These jaws are preferably formed as castings and are fashioned with a central aperture 54. In the illustrated embodiment, aperture 54 is square and slightly larger in size than tube 42. Adjacent a pair of opposite sides of aperture 54, each jaw is formed with a pair of spaced apart ribs 56, 58 with a web portion 60 extending between the ribs. The webs 60 are provided with openings 62 to receive clamping bolts 64. Adjacent the other two sides of opening 54, each clamp is fashioned with a solid rib 66 which extends from one side of the clamp to the other. The ribs 66 are each provided with cam surfaces 68 which taper inwardly from the end face of the rib 66 toward the opening 54. Cam faces 68 are inclined to the longitudinal axis of opening 54 at an angle less than 45° and preferably of about 30°. The cam faces 68 on each jaw, it will be observed, are oppositely inclined. Ribs 56, 58 are cut away as at 69 to provide clearance for cam faces 68.

In mounting the tubular arm 42 on the cross arm 34 by means of the clamping device of this invention, the jaws 50 and 52 are first slipped over the end of tube 42 and are arranged so that one cam face 68 of each jaw engages the longitudinal edges of support plate 38 (FIG. 2). The tube 42 with the jaws 50, 52 supported thereon can be adjusted longitudinally of plate 38 to locate the lift angles 26 in the desired position longitudinally of carriage 12. A spacer plate 70 which is of the same width as support plate 38 is then positioned against the opposite face of tube 42 with its opposite edges engaging the other pair of cam faces 68 of jaws 50, 52. When the elements are thus arranged, nuts 72 on clamping bolts 64 are tightened to draw the two jaws 50, 52 toward one another. Movement of jaws 50, 52 toward one another causes the plates 38 and 70 to be cammed inwardly against the opposite faces of tube 42 by reason of the cam faces 68 on the two jaws. Thus, the plates 38 and 70 are brought into tight frictional engagement with the opposite faces of tube 42; and the arm 42 is thus rigidly mounted on the lateral arm 20 in a position accurately located both transversely and longitudinally of carriage 12.

In mounting the lift angle straps 44 on the ends of tubes 42, jaws 50, 52 are likewise employed. However, jaws 50, 52 in this case are arranged on arm 42 in a position rotated 90° from the jaws 50, 52 that connect arm 42 with lift arm 20. In other words, when the jaws 50, 52 are employed for supporting straps 44, the cam faces 68 extend in a generally vertical direction and straps 44, which are interconnected intermediate their ends by a web 74, have their upper ends engaging the cam faces 68 and positioned against the opposite side faces of tube 42. Before clamping screws 72 are tightened, jaws 50, 52 are accurately located on tube 42 in the proper position transversely of tanks 10 and straps 44 are shifted vertically so that the lift angles 26 will be adjusted to their proper height. Thereafter, lock screws 72 are tightened to securely clamp the straps 44 on the ends of arms 42.

The clamping devices 40 used for mounting the pusher devices 30 on arms 22 are utilized in substantially the same manner as described above. In this case, however, the opposite longitudinal edges of I-beam 46 engage one set of the cam faces 68 and the opposite longitudinal edges of a spacer plate 76 engage the other set of cam faces 68.

As mentioned above, jaws 50, 52 are preferably formed as castings. These castings are fashioned so that they require no machining. Thus, the openings 62 for the clamp bolts 64 are slightly oversize; and likewise, the central opening 54 is slightly oversize so that there is a clearance space 78 between the side faces of tube 42 and the side edges of opening 54. In instances where such clearance space would be undesirable, a stop screw 80 extending through a cored opening 82 in each jaw has its inner end threadedly engaged with a trapped nut 84. After the jaws 50, 52 are arranged on tube 42, the stop screw 80 on each jaw can be tightened to bring the corresponding edges of the openings 54 in the two jaws into engagement with the side faces of tube 42 opposite screws 80 and thus, in effect, provide a snug fit between tube 42 and openings 54.

Thus, it will be seen that we have provided a means for mounting the pusher devices and the lift angles on the arms extending laterally from the carriage of a plating machine which enables ready adjustment of the lift angles and pusher devices and which insures securely maintaining these members in their adjusted positions. It will be observed that manipulation of the clamping devices for tightening them in their proper location is a simple operation. Furthermore, the clamping device of the present invention enables prefabrication of the plating machine as a whole and accurate adjustment of the lift angles and pusher members at final assembly. These clamping devices eliminate the necessity for extremely close tolerances in the location of the arms 20 and 22 on the carriage of the machine.

We claim:

1. In combination, a pair of spaced apart jaws each having a through opening therein, said openings being of the same size and shape and being axially aligned, a support member extending axially through both of said openings with the jaws extending completely around the support member, the opposed inner faces of said jaws each having a pair of cam faces thereon disposed on opposite sides of said member, the two cam faces on each jaw being inclined oppositely to one another and toward the adjacent face of said member in a direction away from the other jaw, a pair of plate members arranged one against each of said two opposite sides of said support member with their longitudinal edges engaging the cam faces of the two jaws, a second support member integrally connected with at least one of said plate members, and means interconnecting the two jaws and operable for urging them toward one another to cam said plate members against the opposite sides of said support member and thereby rigidly clamp said first and second members together.

2. The combination called for in claim 1 wherein said openings are generally rectangular in shape and wherein said opposite sides of said first support member are generally parallel and planar.

3. The combination called for in claim 1 wherein said last mentioned means comprise a pair of screws extending through both of said clamps on opposite sides of said openings.

4. The combination called for in claim 1 wherein said openings are generally rectangular in shape and wherein said last mentioned means comprise a pair of screws extending through both of said clamps, said cam faces being disposed adjacent one set of opposite edges of said openings and the said screws being disposed one adjacent each of the other two side edges of said openings.

5. The combination called for in claim 1 wherein said first support member is generally rectangular in cross section and said openings are generally rectangular in cross section and including a screw threaded in each jaw with its inner end projecting into said opening and engaging the adjacent side of said first support member to bring the opposite side of said first support member into engagement with the side of the openings in the jaws opposite said screws.

6. The combination called for in claim 1 wherein said cam faces are planar and wherein said plate members are shiftable on said jaws in a direction transversely to the longitudinal axis of said first support member.

7. The combination called for in claim 6 wherein said cam faces are inclined to the longitudinal axis of said first support member at an angle no greater than 45°.

8. The combination called for in claim 6 wherein said cam faces are inclined to the longitudinal axis of the first support member at an angle of about 30°.

9. A clamp comprising a pair of spaced apart similarly shaped jaws, means interconnecting the jaws and operable to move the jaws toward each other, each jaw having a through opening therein, said openings being similarly shaped, axially aligned and having their axes generally parallel to the direction of movement of the jaws in response to operation of said interconnecting means, said openings being adapted to receive a member to be clamped, the opposed inner faces of said jaws each having a pair of relatively smooth faced cam portions disposed on opposite sides of the opening therein, said cam portions being inclined inwardly toward the opening in a direction away from the other jaw and the two cam portions on each jaw being oppositely inclined whereby when said member to be clamped is inserted through said aligned openings and plates are arranged between said jaws on opposite sides of the member so that the opposite longitudinal edges of the plates engage said relatively smooth faced cam portions, said interconnecting means may be operated to urge the jaws toward one another and thereby cam the plates toward each other and tightly against the opposite sides of said member.

10. The combination called for in claim 9 wherein said aligned openings are generally rectangular in shape.

11. The combination called for in claim 9 wherein said cam portions are generally planar.

12. The combination called for in claim 11 wherein said interconnecting means comprises a pair of screws extending through said jaws on opposite sides of said openings.

13. The combination called for in claim 12 wherein said openings are rectangular in shape, said cam portions being disposed adjacent one pair of opposite sides of said opening on each jaw and each extending from the inner face of the jaws inwardly toward the opposite side of said rectangular openings and said screws being located adjacent the other two sides of said openings.

14. The combination called for in claim 13 including means on said jaws for reducing the effective size of said openings.

15. The combination called for in claim 14 wherein said last mentioned means comprises a screw extending through a portion of each jaw in a direction generally perpendicular to the axis of the opening in the jaw; said screw being advanceable into the opening.

References Cited in the file of this patent

UNITED STATES PATENTS

| | | |
|---|---|---|
| 360,974 | Shaw | Apr. 12, 1887 |
| 728,919 | Horn | May 26, 1903 |
| 814,092 | Staples | Mar. 6, 1906 |
| 1,125,009 | Curtis | Jan. 12, 1915 |
| 1,128,793 | Kobbe | Feb. 16, 1915 |
| 1,255,674 | Wayman | Feb. 5, 1918 |
| 1,524,275 | Pancoast | Jan. 27, 1925 |
| 1,635,200 | Zilliox | July 12, 1927 |
| 2,473,643 | Froblom | June 21, 1949 |
| 2,498,620 | Hancock | Feb. 21, 1950 |
| 2,535,911 | Frame | Dec. 26, 1950 |
| 2,550,424 | Penn | Apr. 24, 1951 |
| 2,654,462 | Todd | Oct. 6, 1953 |